No. 874,560. PATENTED DEC. 24, 1907.
L. A. BERG.
MACHINE FOR DEPOSITING LIQUID CONFECTIONERY MATERIAL.
APPLICATION FILED JUNE 25, 1906.
2 SHEETS—SHEET 1.
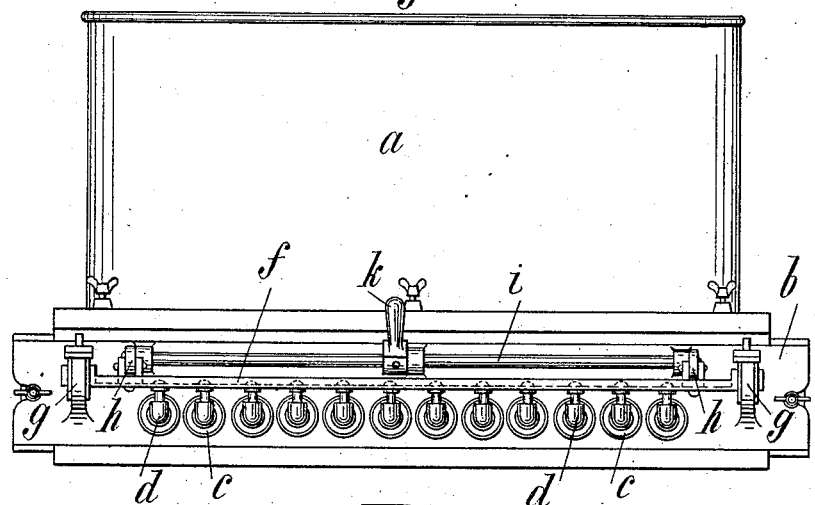
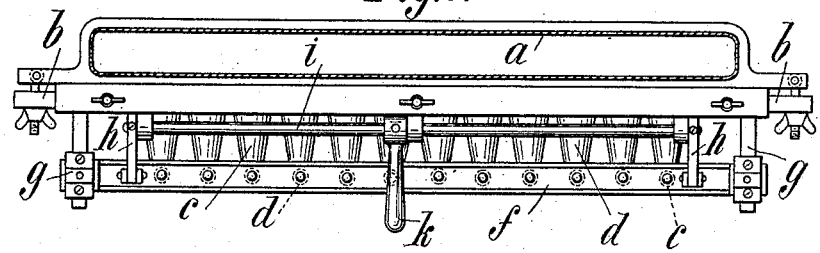
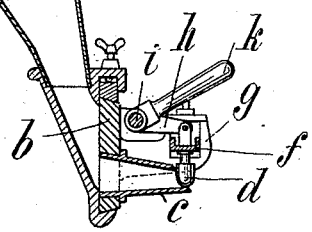
Witnesses.
Inventor.
Ludwig Alexander Berg,
by Henry Orth
atty.

No. 874,560. PATENTED DEC. 24, 1907.
L. A. BERG.
MACHINE FOR DEPOSITING LIQUID CONFECTIONERY MATERIAL.
APPLICATION FILED JUNE 25, 1906.
2 SHEETS—SHEET 2.
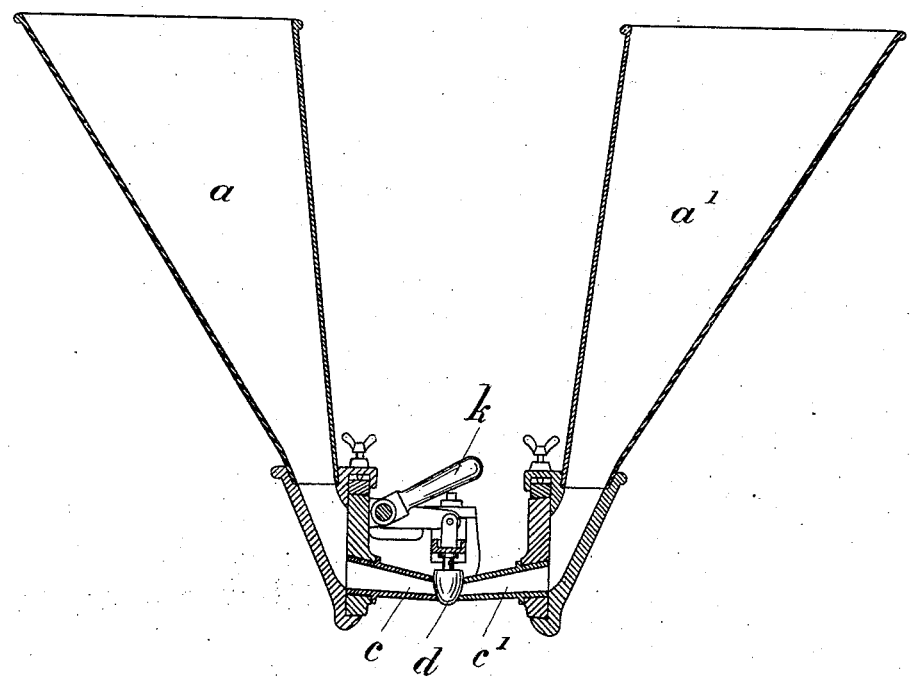
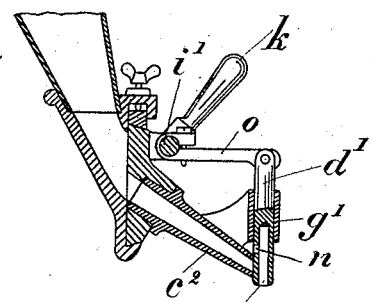

UNITED STATES PATENT OFFICE.

LUDWIG ALEXANDER BERG, OF HAMBURG, GERMANY.

MACHINE FOR DEPOSITING LIQUID CONFECTIONERY MATERIAL.

No. 874,560.   Specification of Letters Patent.   Patented Dec. 24, 1907.

Application filed June 25, 1906. Serial No. 323,357.

*To all whom it may concern:*

Be it known that I, LUDWIG ALEXANDER BERG, a citizen of Hamburg, in the German Empire, have invented a certain new and useful Machine for Depositing Liquid Confectionery Material, of which the following is a specification.

This invention refers to machines for depositing liquid or plastic confectionery material in the manufacture of sweets, such as cream candies and the like. Machines of this description are generally provided with a funnellike tank which contains the confectionery mixture and has at the bottom a number of openings or nozzles through which the material is discharged. In the new machine these nozzles are horizontal or nearly so and are cut off obliquely at their ends, thus creating oval openings into which fit more or less conical stoppers. By these means the advantage is gained that in closing the nozzle by the stopper the quantity of material discharged is cut off clean from the rest and no subsequent dropping is possible.

In the drawing similar letters refer to similar parts.

Figure 1 shows a machine constructed according to this invention in elevation. Fig. 2 shows a transverse section and Fig. 3 a plan of the same machine. Fig. 4 shows a machine having two tanks for two different mixtures of confectionery material for making sweets of two different colors. Fig. 5 shows the section of a modified form of the depositing means for depositing more or less liquid confectionery material.

Referring to Figs. 1—3 of the drawing the tank $a$ is provided at its bottom with a preferably removable plate $b$, to which the discharge nozzles $c$ are attached. The discharge openings which as has been said above, are oval, the preferably conical nozzles being cut off at an angle, are closed by stoppers $d$, which are shaped conical and are provided with a rounded point. The stoppers $d$ are connected to a bar $f$ running along the side of the machine and guided vertically between guide bars $g$ connected with the plate $b$. In front of the plate there is journaled a shaft $i$ having arms $h$, which are in pivotal connection with the bar $f$. By turning a handle $k$ attached to the shaft $i$ the bar $f$ can be raised and lowered, whereby the nozzles $c$ are opened and closed respectively. Instead of rotating the shaft $i$ by a handle this can be done by other means for instance by an eccentric or other mechanical device. Thus the shaft can be kept in oscillating motion at prescribed intervals, for operating the machine continuously.

In the machine shown in Fig. 4 there are two tanks $a$ and $a^1$ the nozzles $c$ and $c^1$ of which are placed opposite one another at such a distance that the stoppers $d$ can close both the nozzles $c$ and $c^1$ at the same time. By turning the handle $k$ both series of nozzles $c$ and $c^1$ are opened at the same time and from both tanks an equal quantity of confectionery material is deposited. These quantities meet at the discharge-openings and drop down together thus forming double sweets, which either consist of two different colored parts or of two parts different in taste as the case may be. Since there is no difficulty in giving the material in the two tanks either a varying or an equal consistency, the two parts of the sweets may either be of any desired different or equal size.

In the modification shown in Fig. 5 the stopper $d^1$ has a longitudinal bore $m$, and a lateral opening $n$, by means of which the bore $m$ may be brought to communicate with the opening of the nozzle $c^2$, to enable a vertical stream of liquor to be deposited. When the stopper $d$ is in the position shown the nozzle $c^2$ is closed and when in its highest positions the nozzle is completely opened. The stopper is guided by a socket $g^1$ preferably attached to the nozzle and is pivoted to an arm $o$ attached to the shaft $i^1$, which may be operated by a handle $k$.

I claim:

1. In a machine for depositing liquid or plastic confectionery material a tank for containing the material, provided at its bottom with a number of discharge-nozzles, each being cut off at an angle to form oval openings, in combination with a corresponding number of stoppers for closing the discharge openings, a bar to which the stoppers are attached, and means for raising and lowering the bar to open and close the nozzles simultaneously.

2. In a machine for depositing liquid or plastic confectionery material two tanks for containing material, of different description each tank being provided with discharge nozzles, the nozzles of one tank standing opposite those of the other tank, in combination with stoppers each adapted to close the nozzles of the tanks opposite each other.

3. In a machine for depositing liquid or plastic confectionery material, discharge-nozzles cut off at the end at an angle, thus forming oval openings, in combination with stoppers for closing the nozzles provided with a longitudinal central bore and a lateral opening, to allow liquor to run out in vertical streams, and means to move the stoppers in their longitudinal direction.

LUDWIG ALEXANDER BERG.

Witnesses:
MAX KAEMPFF,
OTTO W. HELLMUTH.